(12) United States Patent
Jones

(10) Patent No.: US 9,686,452 B2
(45) Date of Patent: Jun. 20, 2017

(54) SURVEILLANCE CAMERA WITH INTEGRAL LARGE-DOMAIN SENSOR

(75) Inventor: Theodore L Jones, Akron, PA (US)

(73) Assignee: Robert Bosch GmbH, Stuttgart (DE)

( * ) Notice: Subject to any disclaimer, the term of this patent is extended or adjusted under 35 U.S.C. 154(b) by 907 days.

(21) Appl. No.: 13/028,407

(22) Filed: Feb. 16, 2011

(65) Prior Publication Data

US 2012/0206604 A1     Aug. 16, 2012

(51) Int. Cl.
| | |
|---|---|
| *H04N 7/18* | (2006.01) |
| *H04N 5/225* | (2006.01) |
| *H04N 5/247* | (2006.01) |
| *G09B 5/08* | (2006.01) |
| *G09B 5/10* | (2006.01) |
| *G09B 5/12* | (2006.01) |
| *G09B 5/14* | (2006.01) |
| *G09B 25/02* | (2006.01) |

(52) U.S. Cl.
CPC ............. *H04N 5/2251* (2013.01); *G09B 5/08* (2013.01); *G09B 5/10* (2013.01); *G09B 5/12* (2013.01); *G09B 5/14* (2013.01); *G09B 25/02* (2013.01); *H04N 5/247* (2013.01)

(58) Field of Classification Search
CPC ........ H04N 5/2251; H04N 5/247; G09B 5/08; G09B 25/02; G09B 5/12; G09B 5/14; G09B 5/10
USPC ......... 348/143, 159, 373; 396/419, 427, 428
See application file for complete search history.

(56) References Cited

U.S. PATENT DOCUMENTS

| | | | |
|---|---|---|---|
| 5,912,700 A * | 6/1999 | Honey et al. ................ | 348/157 |
| 6,215,519 B1 | 4/2001 | Nayar et al. | |
| 6,628,338 B1 * | 9/2003 | Elberbaum et al. ......... | 348/373 |
| 7,015,954 B1 * | 3/2006 | Foote et al. ............... | 348/218.1 |
| 8,279,283 B2 * | 10/2012 | McCormack ................ | 348/159 |
| 2002/0005902 A1 | 1/2002 | Yuen | |
| 2002/0102101 A1 | 8/2002 | Pelletier | |
| 2002/0146249 A1 * | 10/2002 | Ambrose ...................... | 396/428 |
| 2002/0191076 A1 | 12/2002 | Wada et al. | |
| 2003/0007793 A1 | 1/2003 | Suzuki | |
| 2003/0021598 A1 | 1/2003 | Higashiyama et al. | |
| 2003/0025791 A1 * | 2/2003 | Kaylor et al. ............... | 348/143 |
| 2003/0160868 A1 | 8/2003 | Kakou et al. | |
| 2003/0210329 A1 * | 11/2003 | Aagaard et al. ............. | 348/159 |
| 2005/0134685 A1 * | 6/2005 | Egnal et al. ................. | 348/157 |
| 2006/0028550 A1 | 2/2006 | Palmer, Jr. et al. | |
| 2006/0056056 A1 | 3/2006 | Ahiska et al. | |
| 2006/0077262 A1 | 4/2006 | Miyamaki et al. | |
| 2006/0203090 A1 * | 9/2006 | Wang et al. ................. | 348/143 |
| 2007/0182813 A1 * | 8/2007 | Kozlov et al. ................ | 348/61 |

(Continued)

FOREIGN PATENT DOCUMENTS

| | | | |
|---|---|---|---|
| WO | 2008079862 A1 | 7/2008 | |
| WO | WO 2008079862 A1 * | 7/2008 | |

(Continued)

*Primary Examiner* — Zhihan Zhou
(74) *Attorney, Agent, or Firm* — Michael Best & Friedrich LLP

(57) ABSTRACT

A surveillance camera arrangement includes a first camera that performs panning movements about a pan axis, and that performs tilting movements within a plane of tilting motion. The plane of tilting motion is offset from, and substantially parallel to, the pan axis. A second camera is substantially aligned with the pan axis. The second camera has a wider field of view than the first camera.

24 Claims, 15 Drawing Sheets

(56) References Cited

U.S. PATENT DOCUMENTS

| | | | |
|---|---|---|---|
| 2007/0200933 A1* | 8/2007 | Watanabe et al. | 348/211.11 |
| 2007/0268369 A1* | 11/2007 | Amano et al. | 348/207.99 |
| 2008/0259159 A1* | 10/2008 | Nystrom | 348/143 |
| 2009/0040302 A1 | 2/2009 | Thompson | |
| 2009/0237354 A1* | 9/2009 | Abe | 345/156 |
| 2010/0141767 A1* | 6/2010 | Mohanty et al. | 348/159 |
| 2011/0187866 A1* | 8/2011 | Lee et al. | 348/159 |

FOREIGN PATENT DOCUMENTS

| | | |
|---|---|---|
| WO | 2009066988 A2 | 5/2009 |
| WO | WO2009066988 A3 | 5/2009 |

* cited by examiner

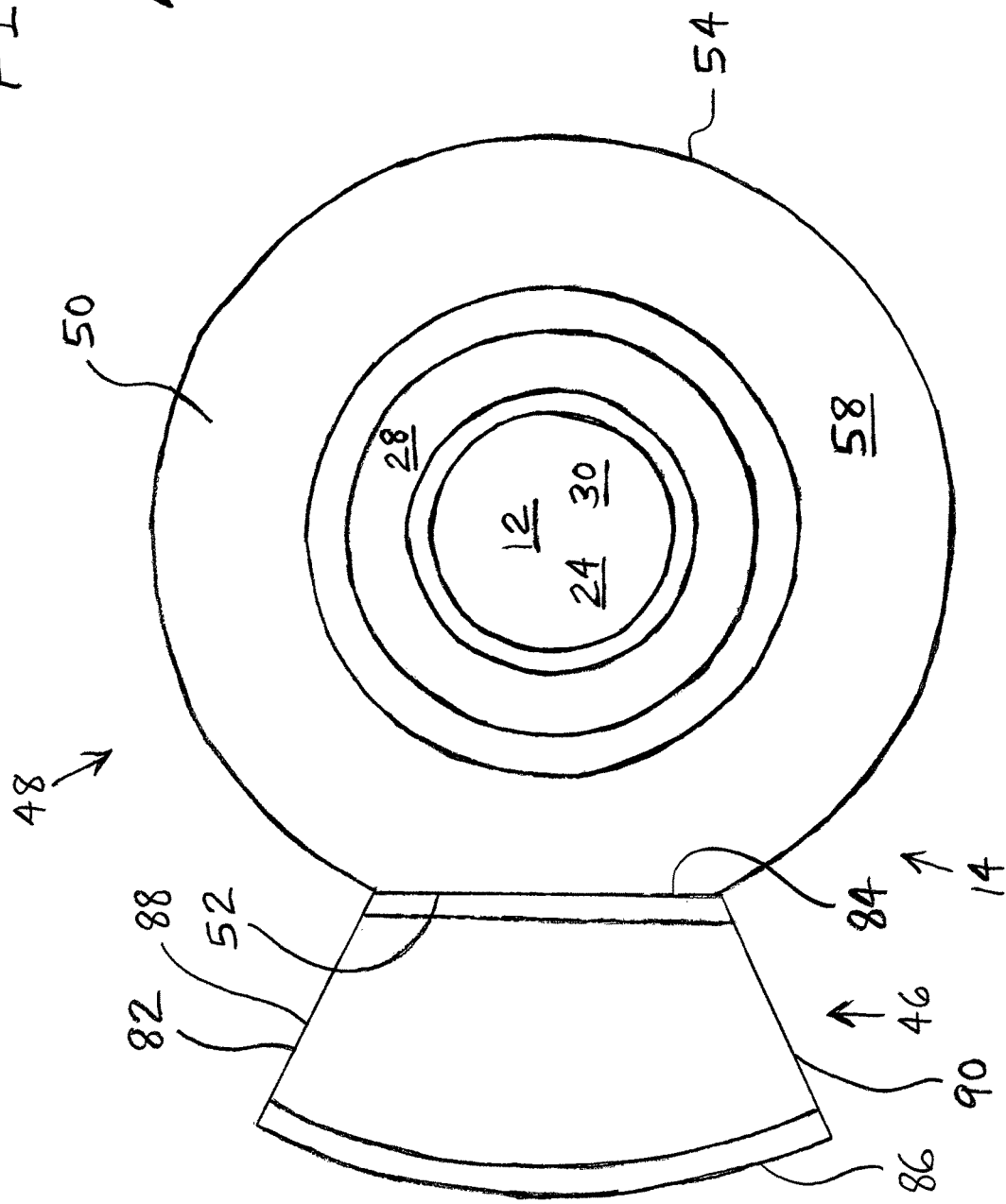

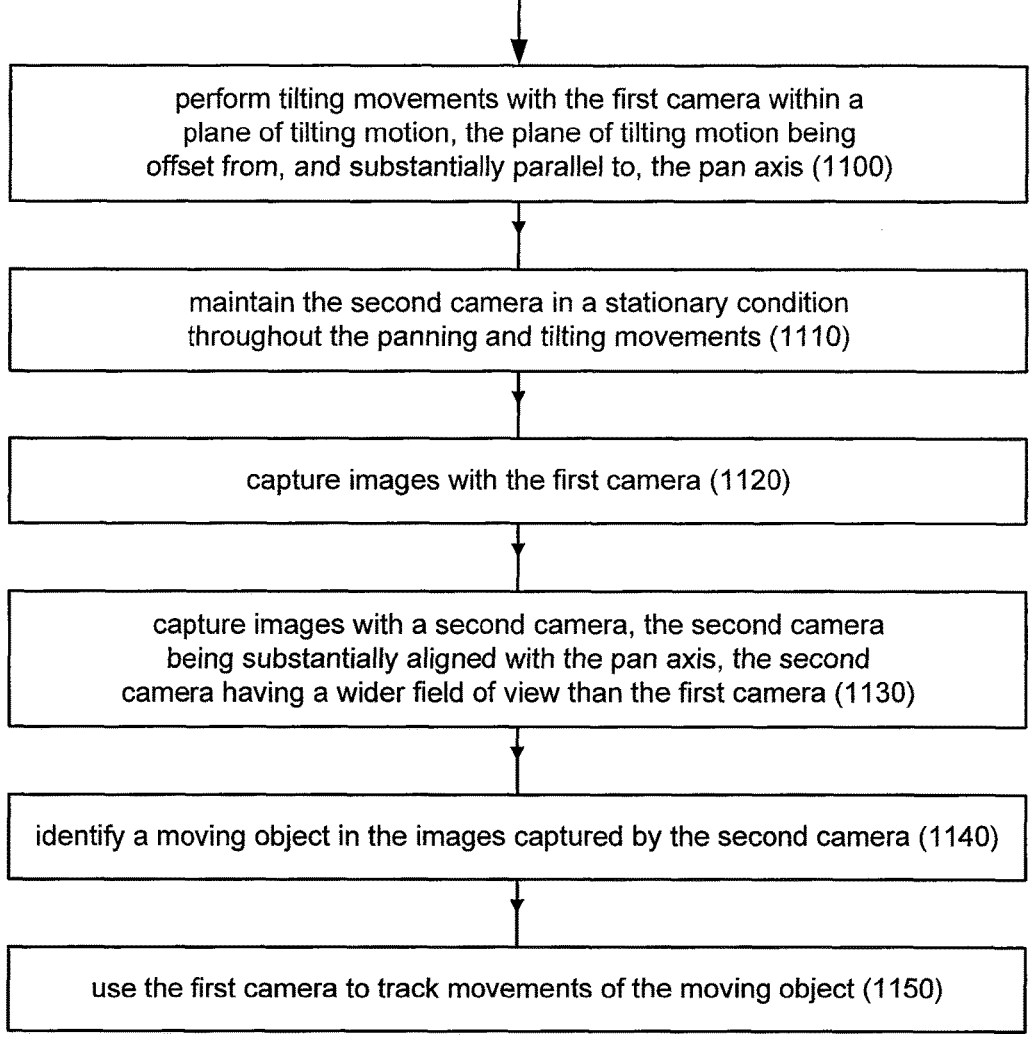

US 9,686,452 B2

SURVEILLANCE CAMERA WITH INTEGRAL LARGE-DOMAIN SENSOR

BACKGROUND OF THE INVENTION

1. Field of the Invention

The present invention relates to surveillance cameras, and, more particularly, to surveillance cameras that undergo tilt movements.

2. Description of the Related Art

Surveillance camera systems are commonly used by retail stores, banks, casinos and other organizations to monitor activities within a given area. The cameras are often provided with the capability to pan and tilt in order to acquire images over a wide domain. The tilt of the camera generally refers to the pivoting of the camera about a horizontal axis that is parallel to the floor, such that the lens of the camera may tilt between an upwardly pointing position and a downwardly pointing position. The pan of the camera refers to the rotation of the camera about a vertical axis that is perpendicular to the floor, such that the lens may scan from side to side. The cameras may also be able to zoom in order to reduce or enlarge the field of view.

A problem is that a pan-tilt-zoom camera can view only a small portion of a room at a time. Thus, an entire room cannot be continuously monitored by use of a pan-tilt-zoom camera, either by human personnel or by a surveillance algorithm. That is, in order to provide the capability to acquire a high-resolution image of distant objects, traditional high-zoom pan-tilt surveillance cameras view only a small part of the total possible viewing domain at any given time.

A large-domain sensor is capable of sensing an entire room at one time, but with lower resolution. So it is therefore desirable to combine it with a high-resolution pan-tilt-zoom camera. There are limitations when combining a large-domain sensor with a pan-tilt camera, however. Most installations position the camera in a downward-facing orientation so the user may track moving objects that pass underneath. Therefore, the stationary pan base is above the moving pan and tilt stages. If a sensor platform were to be provided on a moving camera in this orientation such that the sensor platform is disposed low enough to have an unobstructed view in all directions, then the sensor platform would also obstruct the view of the camera. If the sensor were to be positioned to one side of the stationary camera pan base, then multiple sensors would be needed in order to provide adequate coverage, and even then the area directly beneath the camera may be obstructed. Because of these problems, the system-level integration needed to provide continuously uninterrupted sensor coverage with multiple sensors introduces complications and adds cost. Another problem with this approach is that if the sensor is located on the moving pan stage but is not positioned precisely on the pan axis, then the system algorithms that use inputs from the sensor must compensate for the changing position of the sensor as the unit pans.

What is neither disclosed nor suggested by the prior art is a surveillance camera arrangement including both a large-domain sensor and a pan-tilt-zoom camera in a same hemispherical dome window, wherein the field of view of the pan-tilt-zoom camera is unimpeded by the large-domain sensor.

SUMMARY OF THE INVENTION

The present invention is directed to a high-zoom pan-tilt surveillance camera including a large-domain sensor that provides a global input which can be viewed separately from the camera image. In one embodiment, the large-domain sensor is a fish-eye lens camera. The image from the large-domain sensor may be viewed in combination with, and/or to complement, the camera image. For example, the global sensor output may be displayed with a superimposed indicator showing where the current camera view is located within the sensor view. In another embodiment, the invention includes a processor with real-time content analysis capability that uses inputs from the large-domain sensor to aid in the control of automated camera functions such as zoom, pan, or tilt adjustment and tracking.

The invention comprises, in one form thereof, a surveillance camera arrangement including a first camera that performs panning movements about a pan axis, and that performs tilting movements within a plane of tilting motion. The plane of tilting motion is offset from, and substantially parallel to, the pan axis. A second camera is substantially aligned with the pan axis. The second camera has a wider field of view than the first camera.

The invention comprises, in another form thereof, a method of operating a surveillance camera arrangement, including performing panning movements with a first camera about a pan axis. Tilting movements are performed with the first camera within a plane of tilting motion. The plane of tilting motion is offset from, and substantially parallel to, the pan axis. The first camera is used to capture images. A second camera is also used to capture images. The second camera is substantially aligned with the pan axis. The second camera has a wider field of view than the first camera.

The invention comprises, in yet another form thereof, a surveillance camera arrangement including a first camera configured to perform first panning movements about a pan axis and to perform first tilting movements within a first plane of tilting motion. The first plane of tilting motion is offset from, and substantially parallel to, the pan axis. A second camera is mechanically coupled to the first camera. The second camera is configured to perform second panning movements about the pan axis and perform second tilting movements within a second plane of tilting motion. The second plane of tilting motion is offset from, and substantially parallel to, the pan axis. A third camera is mechanically coupled to each of the first and second cameras. The third camera is substantially aligned with the pan axis. The third camera has a wider field of view than each of the first and second cameras.

An advantage of the present invention is that the wide angle lens camera may capture an image of an entire room, and yet a pan-tilt-zoom camera in a same hemispherical dome window of the wide angle lens camera has an unimpeded view of any location in the room.

Another advantage is that the addition of a large-domain sensor can enhance the surveillance capability of this type of camera system.

Yet another advantage is that a surveillance camera arrangement with a stationary large-domain sensor expands the utility of the traditional pan-tilt surveillance camera without obstructing the view of the camera or requiring complicated and costly system-level technical measures to make the sensor input useful.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 5 is a bottom view of the surveillance camera arrangement of FIG. 1 along line 5-5.

FIG. 10a-b is a flow chart of one embodiment of a method of the present invention for operating a surveillance camera arrangement.

Figure 1:
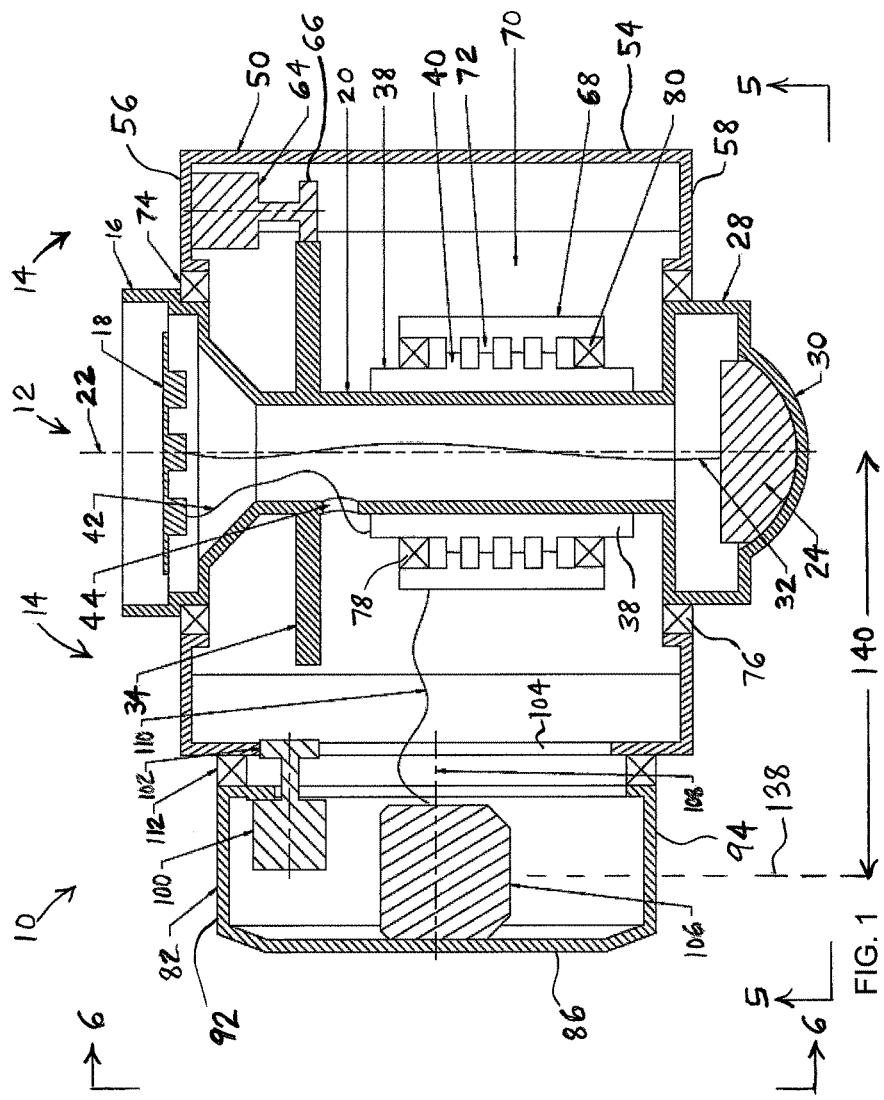
FIG. 1 is a cross sectional side view of one embodiment of a surveillance camera arrangement of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Figure 2:
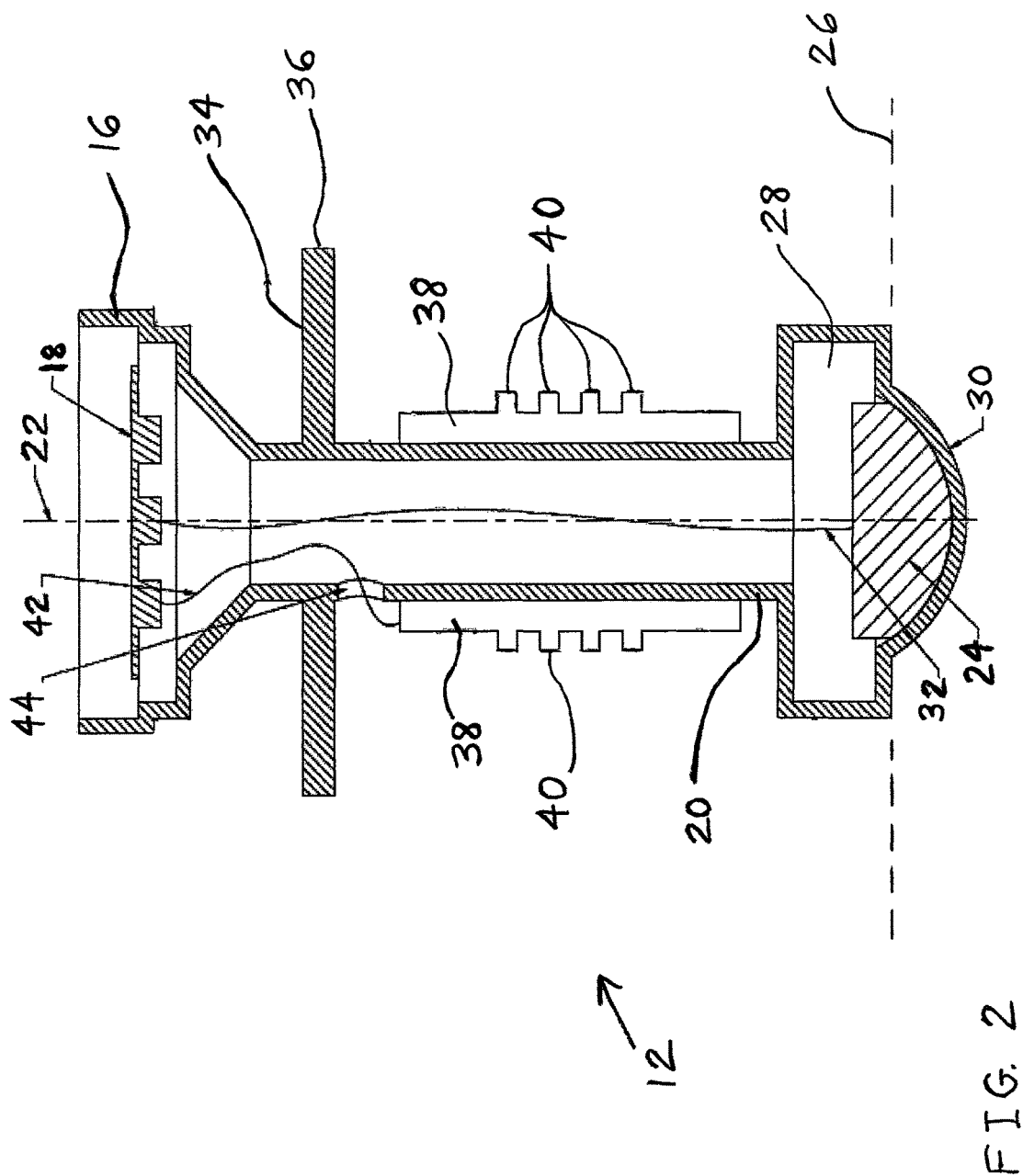
FIG. 2 is a cross sectional side view of the stationary stage of the arrangement of FIG. 1.
Figure 3:
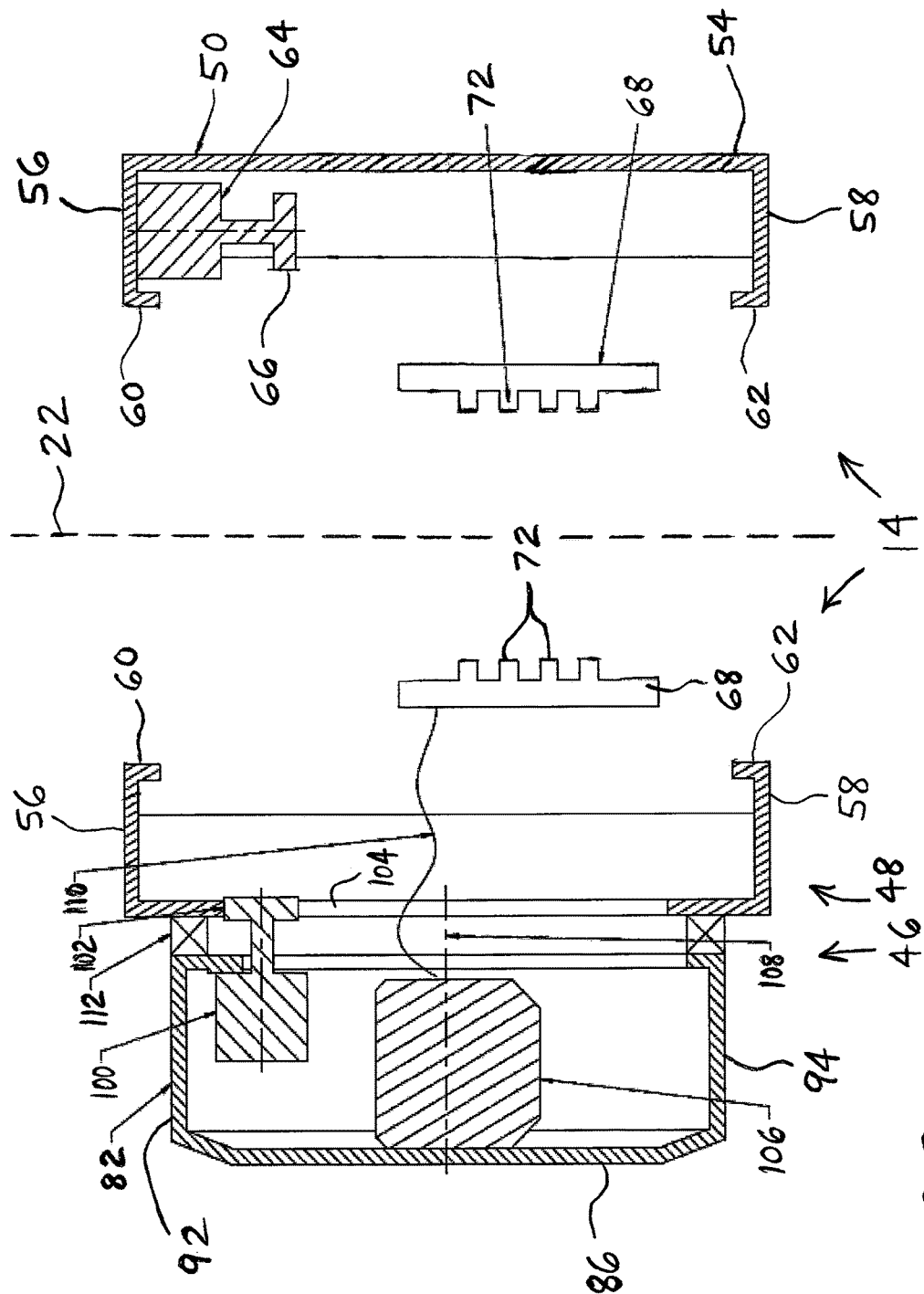
FIG. 3 is a cross sectional side view of the moving stage of the arrangement of FIG. 1.

Referring now to the drawings, and particularly to FIG. 1, there is illustrated one embodiment of a surveillance camera arrangement 10 of the present invention including a stationary stage 12, shown in isolation in FIG. 2, and a moving stage 14, shown in isolation in FIG. 3. Stationary stage 12 includes a stationary base 16 having an electrical interface 18 disposed therein. Stationary stage 12 also includes a stationary, hollow, cylindrical core 20 that is centered relative to a pan axis 22. That is, pan axis 22 is coincident with a longitudinal axis of core 20.

Stationary stage 12 further includes a stationary large-domain sensor 24 capable of detecting movement and/or objects within a field-of-view encompassing all directions below an imaginary plane 26 (FIG. 2). That is, sensor 24 may view in all downward or lateral directions within a hemisphere defined by plane 26. Stated differently, sensor 24 may be capable of receiving input from below the camera and from all lateral directions. Sensor 24 is disposed within a stationary sensor enclosure 28 at the bottom of core 20. Enclosure 28 includes a window 30 through which sensor 24 may sense objects and movements. In one embodiment, window 30 permits visible light to pass therethrough from the outside of enclosure 28 and into enclosure 28.

An electrical connection in the form of an electrical conductor 32 electrically interconnects sensor 24 and electrical interface 18 in base 16. The electrical connection may include a plurality of electrical conductors.

Attached to cylindrical core 20 is an annular pan gear 34 that is oriented perpendicular to vertical pan axis 22. A plurality of gear teeth (not shown) may be disposed on an outer circumferential surface 36 (FIG. 2) of gear 34.

A hollow slip ring stator 38 is fixedly attached or fastened to an outer surface of core 20. Annular dynamic electrical contact elements 40 may be disposed on slip ring stator 38. Contact elements 40 may be evenly vertically spaced along stator 38.

An electrical connection in the form of an electrical conductor 42 electrically interconnects electrical interface 18 and slip ring stator 38. The electrical connection may include a plurality of electrical conductors. Core 20 includes a throughhole 44 that allows conductor 42 to pass through the cylindrical wall of core 20.

Figure 4:
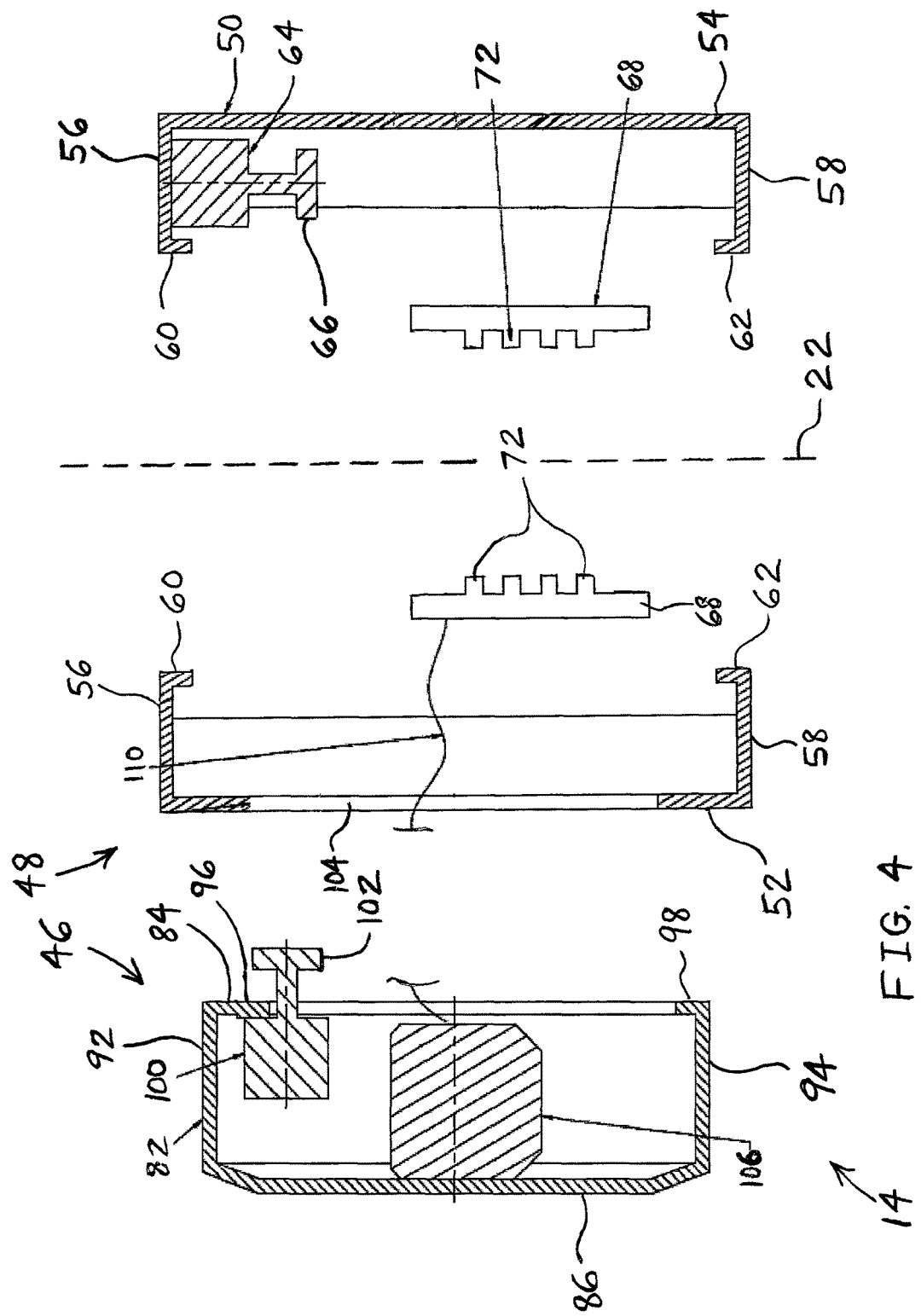
FIG. 4 is an exploded, cross sectional side view of the moving stage of the arrangement of FIG. 1.

The entirety of moving stage 14 may be rotatable about the vertical pan axis 22. As best shown in the exploded view of FIG. 4, moving stage 14 may include a tilting and panning stage 46 and a panning-only stage 48. As described in more detail hereinbelow, tilting and panning stage 46 may undergo both panning and tilting movements, while panning-only stage 48 may undergo only panning movements.

Panning-only stage 48 may include a substantially cylindrical enclosure or housing 50 having a flat wall 52 that interfaces with tilting and panning stage 46. Enclosure 50 includes an outer annular wall 54 and two opposing ring-shaped end walls 56, 58. A downwardly extending lip 60 is attached to a radially inward edge of end wall 56. An opposing upwardly extending lip 62 is attached to a radially inward edge of end wall 58.

Panning-only stage 48 includes a panning motor 64 attached to end wall 56. Motor 64 rotatingly drives a pinion 66 that meshingly engages the teeth on outer circumferential surface 36 of gear 34. Thus, as pinion 66 rotates, pinion 66 traverses outer circumferential surface 36 and pulls the remainder of moving stage 14 along with it, including both tilting and panning stage 46 and panning-only stage 48.

A slip ring rotor 68 is attached to enclosure 50 and interfaces with slip ring stator 38. Rotor 68 and stator 38 conjointly form a slip ring 70 (FIG. 1). Annular dynamic electrical contact elements 72 may be disposed on slip ring rotor 68. Contact elements 72 may be evenly vertically spaced along rotor 68, and may mate with contact elements 40 on stator 38.

A ring-shaped pan bearing/seal 74 (FIG. 1) is disposed between stationary base 16 and lip 60 of moving stage enclosure 50. Another ring-shaped pan bearing/seal 76 is disposed between stationary sensor enclosure 28 and lip 62 of moving stage enclosure 50. Bearing/seals 74, 76 cooperate to maintain a fixed distance and relative alignment between stationary stage 12 and moving stage 14, and yet enable moving stage 14 to rotate or pan about axis 22 relative to stationary stage 12 with a limited level of friction.

A pair of optional ring-shaped bearings 78, 80 (FIG. 1) may be disposed between slip ring rotor 68 and slip ring stator 38. Bearings 78, 80 cooperate to maintain a fixed distance and relative alignment between slip ring rotor 68 and slip ring stator 38, and yet enable rotor 68 to rotate or pan about axis 22 relative to stator 38 with a limited level of friction.

Tilting and panning stage 46 may include an enclosure or housing 82 having a flat wall 84 (FIG. 4) that interfaces with panning-only stage 48. Enclosure 82 includes an outer arcuate wall 86, two opposing planar side walls 88, 90 (FIG. 5), and two opposing planar end walls 92, 94. Alternatively, wall 86 may also be planar. Although side walls 88, 90 are shown as being nonparallel in FIG. 5, it is also possible for side walls 88, 90 to be parallel. Wall 84 includes a downwardly extending lip 96 (FIG. 4) that is attached to a radially inward edge of end wall 92. Wall 84 also includes an opposing upwardly extending lip 98 that is attached to a radially inward edge of end wall 94. End wall 94 may have a throughhole or transparent window (not shown) through which camera 106 may capture images.

Tilting and panning stage 46 includes a tilting motor 100 attached to flat wall 84. Motor 100 may be attached to lip 96 in particular. Motor 100 rotatingly drives a pinion 102. Flat wall 52 of enclosure 50 includes a circular cutout 104 that receives pinion 102. In another embodiment, cutout 104 may be arcuate. At least a portion of the circumferential edge of wall 52 that defines cutout 104 may include teeth (not shown). Pinion 102 may meshingly engage the teeth on the circumferential edge of wall 52. Thus, as pinion 102 rotates, pinion 102 traverses the outer circumferential edge of cutout 104 and pulls the remainder of tilting and panning stage 46 along with it, including a camera 106 that is attached to outer wall 86. More particularly, tilting and panning stage 46 rotates about a tilt axis 108 that may be defined by the radius of the outer circumferential edge of cutout 104. Tilting and panning stage 46 may undergo tilting movement relative to both panning-only stage 48 and stationary stage 12.

An electrical connection in the form of an electrical conductor 110 electrically interconnects camera 106 and slip ring rotor 68. The electrical connection may include a plurality of electrical conductors.

A ring-shaped bearing/seal 112 (FIG. 1) may be disposed between wall 84 of tilting and panning stage 46 and wall 52 of panning-only stage 48. Bearing/seal 112 may maintain a fixed distance and relative alignment between enclosure 86 of tilting and panning stage 46 and enclosure 50 of panning-only stage 48, and yet enable stage 46 to rotate or tilt about axis 108 relative to stage 48 with a limited level of friction.

Figure 6A:
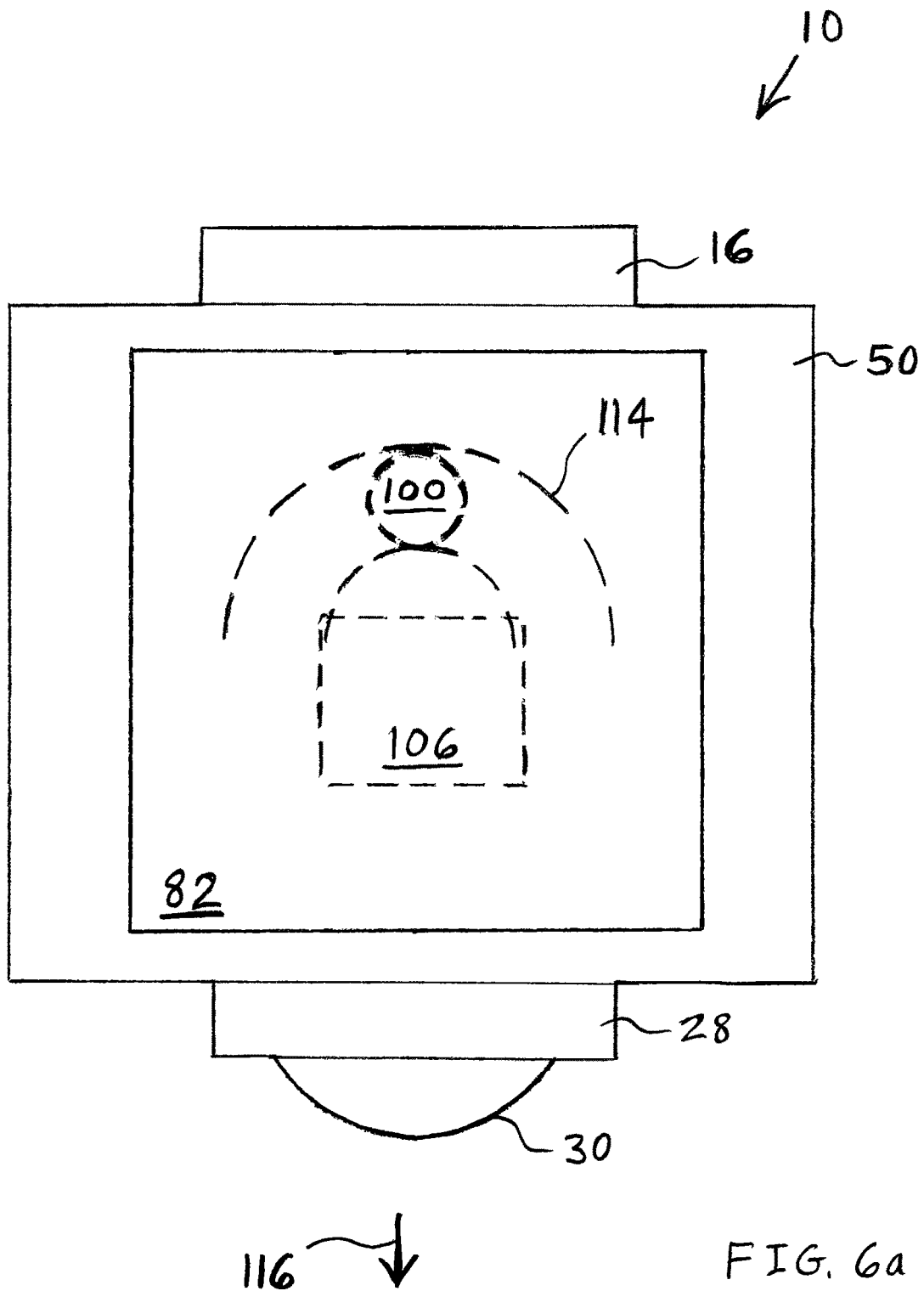
FIG. 6a is a side view of the surveillance camera arrangement of FIG. 1 along line 6-6.

As shown in the specific embodiment of FIGS. 6a-6e, tilting and panning stage 46 may be tiltable over a span of about 180 degrees. FIG. 6a illustrates the position of tilting and panning stage 46 as depicted in FIG. 1 wherein motor 100 is in a middle of a range of possible positions indicated at 114 and camera 106 is directed in a downward direction indicated by arrow 116. That is, the field of view of camera 106 may be centered in the direction of downward arrow 116.

Figure 6B:
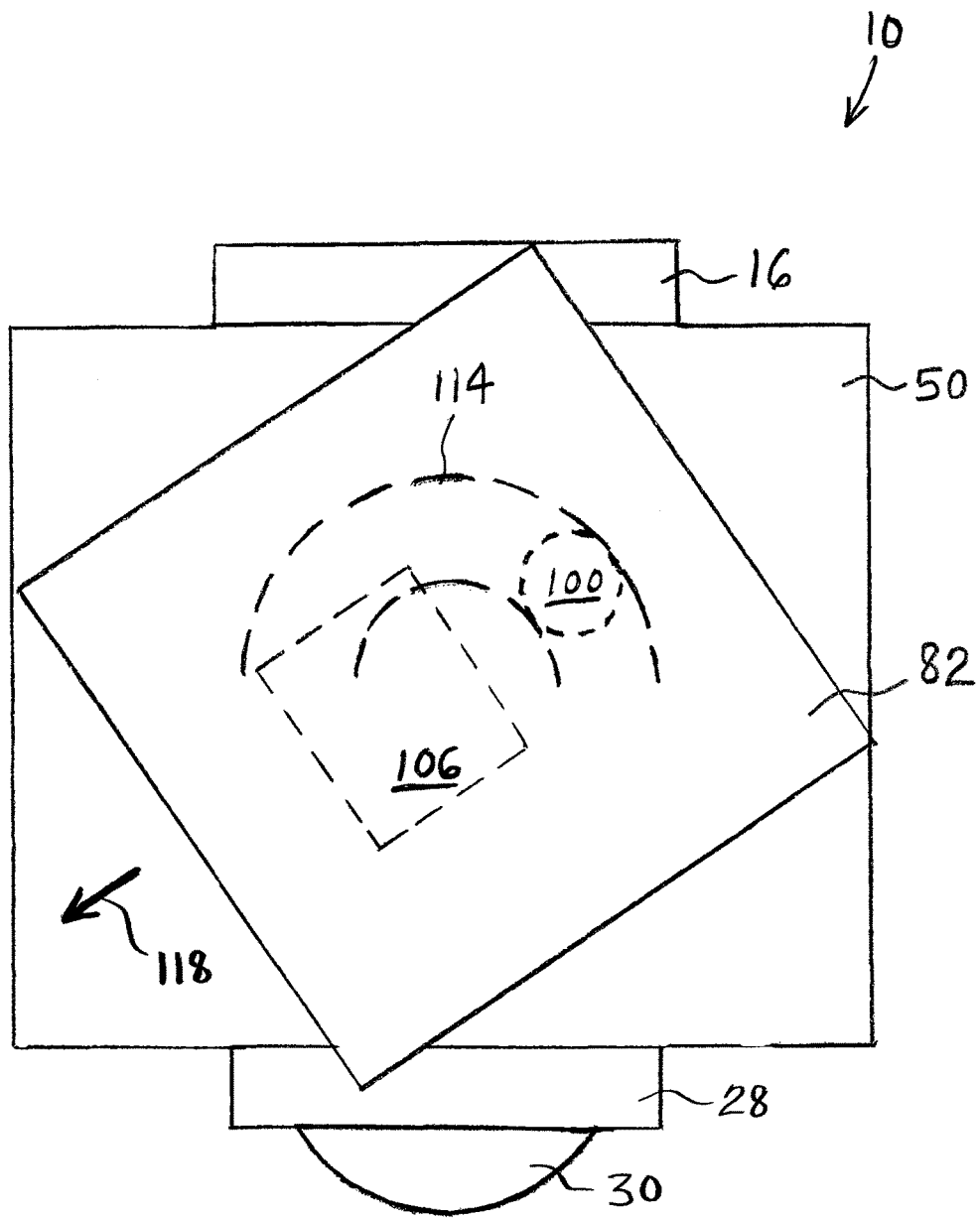
FIG. 6b is a side view of the surveillance camera arrangement of FIG. 1 with the camera tilted about ninety degrees clockwise.

FIG. 6b illustrates the position of tilting and panning stage 46 after motor 100 has been rotated in a counterclockwise direction relative to the viewpoint of FIG. 6b such that pinion 102 meshingly traverses the circumferential edge of wall 52 that defines cutout 104. Pinion 102 tilts the remainder of tilting and panning stage 46 along with it about tilt axis 108 while bearing/seal 112 maintains stage 46 centered on tilt axis 108. Camera 106 is pointed in a direction indicated by arrow 118 that is displaced about 45 degrees from downward direction 116.

Figure 6C:
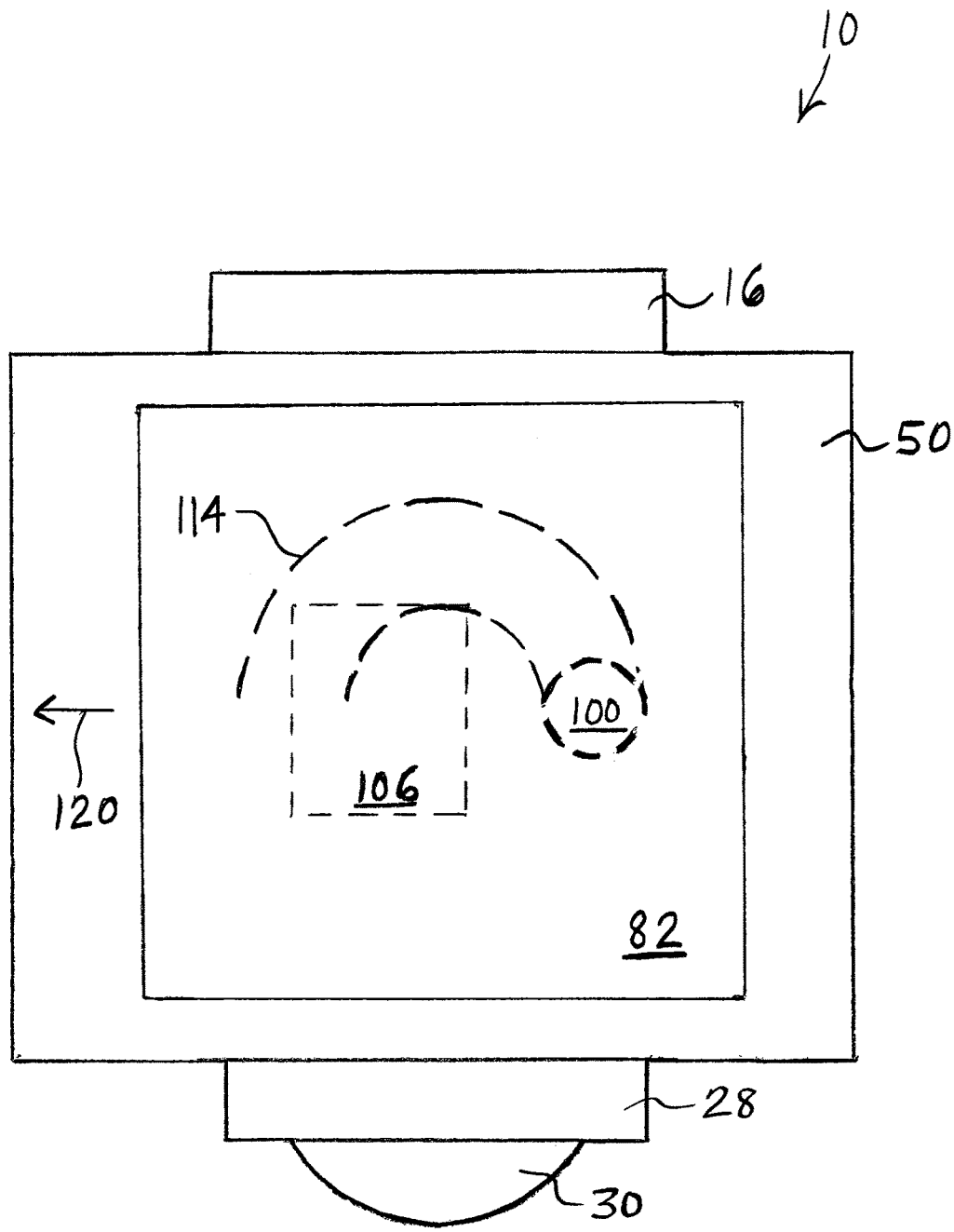
FIG. 6c is a side view of the surveillance camera arrangement of FIG. 1 with the camera tilted about one hundred eighty degrees clockwise.

FIG. 6c illustrates the position of tilting and panning stage 46 after motor 100 has been further rotated in a counterclockwise direction such that camera 106 is pointed in a substantially horizontal direction indicated by arrow 120 that is displaced about 90 degrees from downward direction 116. In this embodiment, this horizontal direction 120 is as high as camera 106 can be directed, as indicted by motor 100 being at the end of the range 114 of possible positions.

Figure 6D:
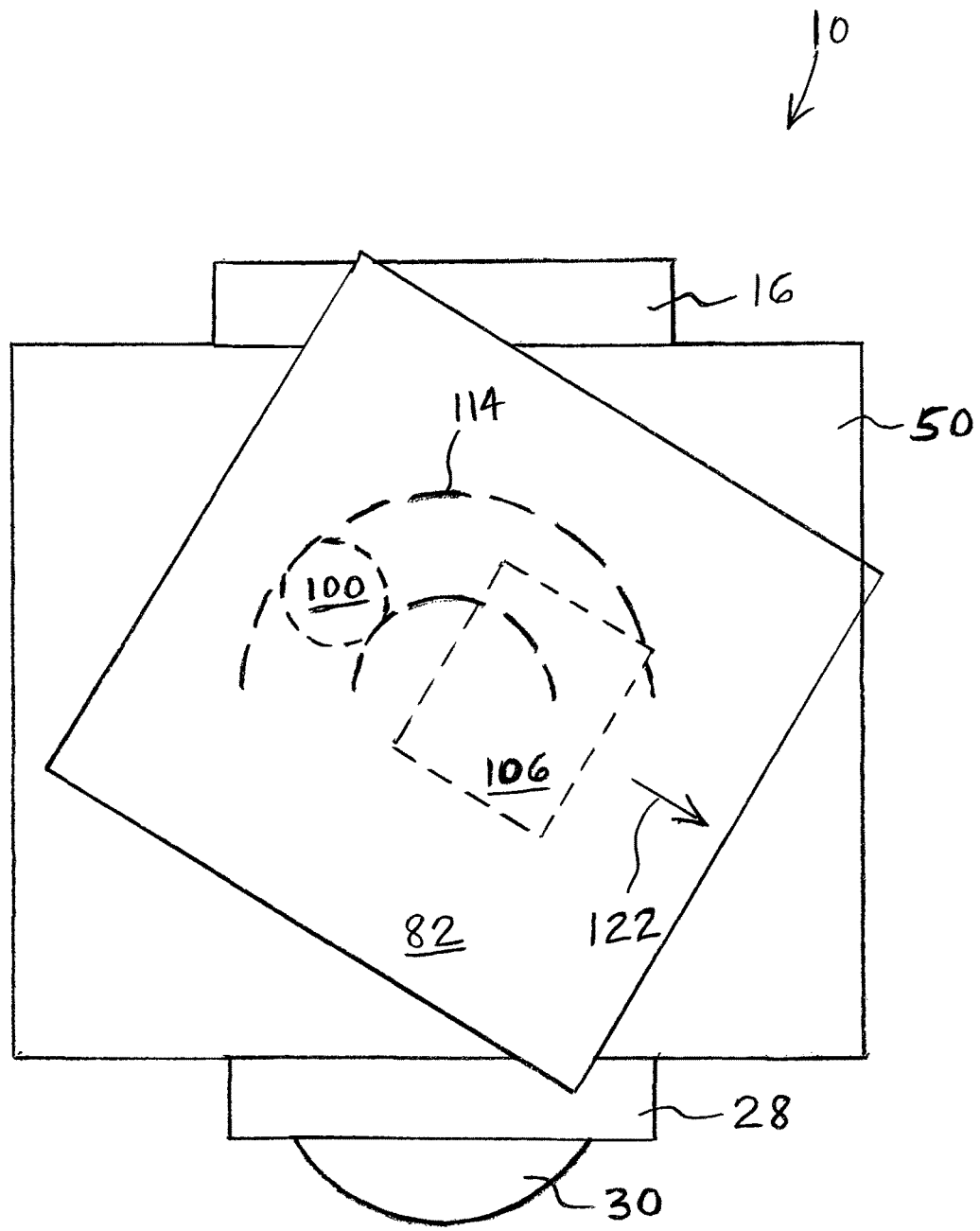
FIG. 6d is a side view of the surveillance camera arrangement of FIG. 1 with the camera tilted about ninety degrees counterclockwise.
Figure 6E:
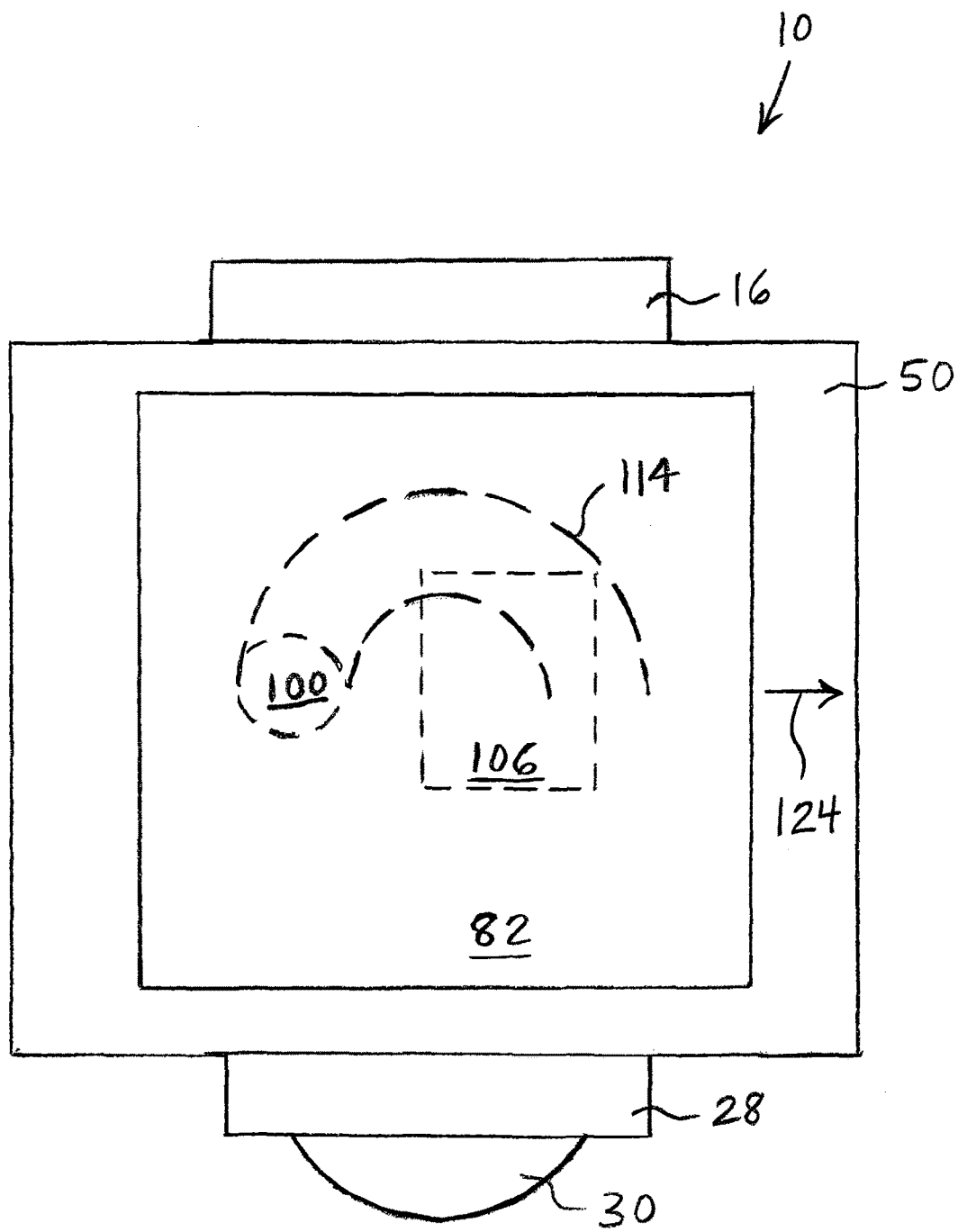
FIG. 6e is a side view of the surveillance camera arrangement of FIG. 1 with the camera tilted about one hundred eighty degrees counterclockwise.

As illustrated in FIGS. 6d-e, tilting and panning stage 46 may be tilted in the direction opposite to the direction indicated in FIGS. 6b-c. FIG. 6d illustrates the position of tilting and panning stage 46 after motor 100 has been rotated in a clockwise direction such that pinion 102 meshingly traverses the circumferential edge of wall 52 that defines cutout 104. Pinion 102 tilts the remainder of tilting and panning stage 46 along with it about tilt axis 108 while bearing/seal 112 maintains stage 46 centered on tilt axis 108. Camera 106 is pointed in a direction indicated by arrow 122 that is displaced about 45 degrees from downward direction 116, and about 90 degrees from direction 118.

FIG. 6e illustrates the position of tilting and panning stage 46 after motor 100 has been further rotated in a clockwise direction such that camera 106 is pointed in a substantially horizontal direction indicated by arrow 124 that is displaced about 90 degrees from downward direction 116, and about 180 degrees from the other horizontal direction 120. In this embodiment, this other horizontal direction 124 is also as high as camera 106 can be directed, as indicted by motor 100 being at the end of the range 114 of possible positions that is opposite from the end depicted in FIG. 6c. Although the profile of enclosure 82 appears square-shaped in FIGS. 6a-e, it is possible in another embodiment for the profile of enclosure 82 to appear circular from the viewpoint in FIGS. 6a-e.

Figure 7:
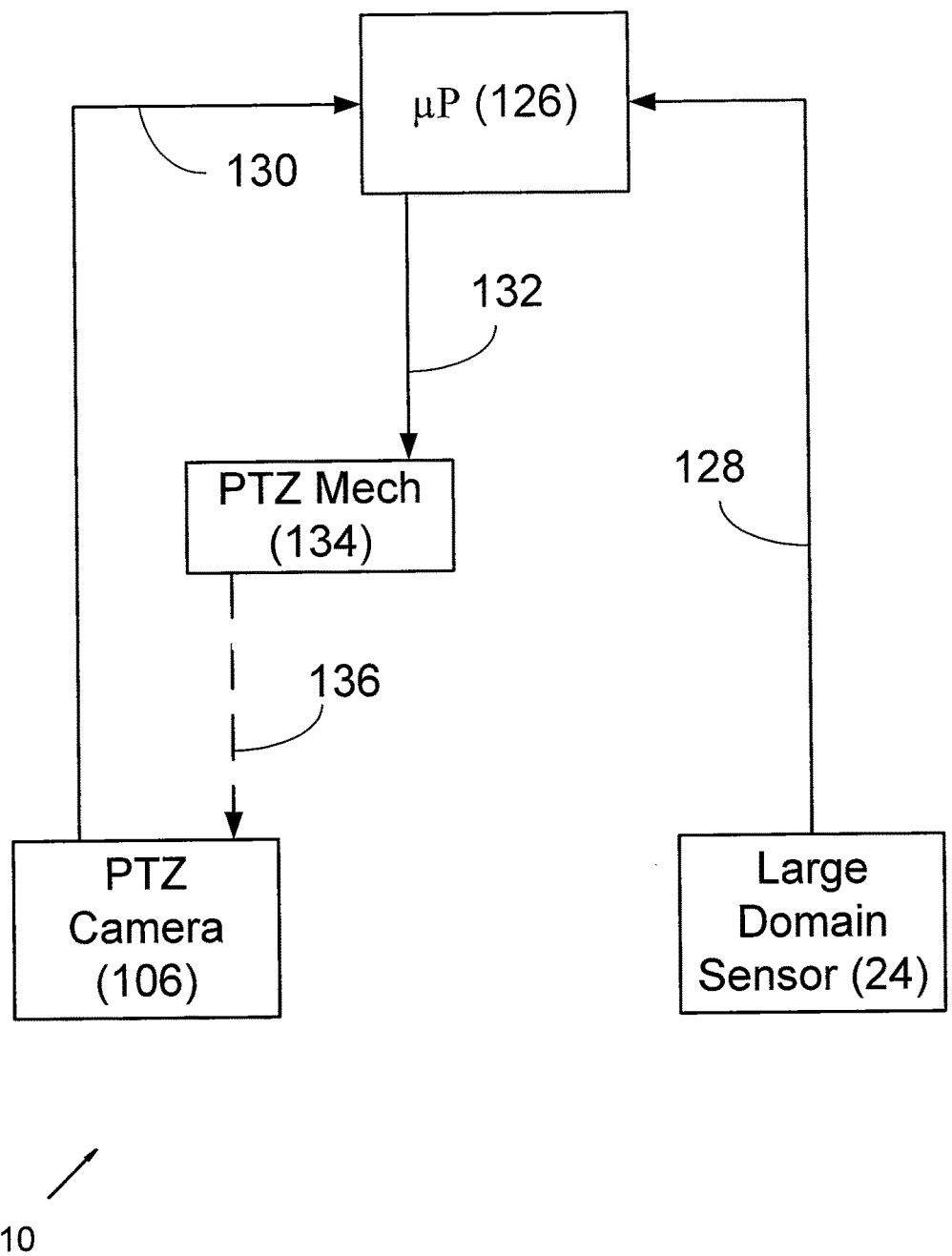
FIG. 7 is a block diagram of the surveillance camera arrangement of FIG. 1.

A block diagram of surveillance camera arrangement 10 is illustrated in FIG. 7. Large domain sensor 24 may be electrically connected to an electrical controller 126 and may provide sensor signals to electrical controller 126 as indicated by arrow 128. Electrical controller 126 may include a microprocessor. The sensor signals may be carried from sensor 24 to electrical controller 126 via conductor 32 and electrical interface 18. Another electrical conductor (not shown) may carry the sensor signals from interface 18 to electrical controller 126.

Similarly, camera 106 may be electrically connected to electrical controller 126 and may provide camera signals to electrical controller 126 as indicated by arrow 130. The camera signals may be carried from camera 106 to electrical controller 126 via conductor 110, slip ring 70, conductor 42 and electrical interface 18. Another electrical conductor (not shown) may carry the camera signals from interface 18 to electrical controller 126.

As indicated at arrow 132, electrical controller 126 may transmit control information and commands to a pan tilt zoom (PTZ) mechanism 134. In one embodiment, PTZ mechanism 134 includes pan motor 64 and tilt motor 100. The source of at least a portion of the control information and commands may be a human operator who may use a user interface (not shown) to input control information and commands. The control information and commands may then be transmitted via an electrical conductor (not shown) to electrical controller 126 for processing. The control information and commands may instruct the pan and tilt motors 64, 100 in which direction (e.g., clockwise or counterclockwise) to perform the panning and/or tilting movements. The control information and commands may further control the speed (which may be zero for a majority of the operating time of surveillance camera arrangement 10), acceleration, and/or deceleration of the panning and tilting movements. For example, a human operator may select a new field of view of the camera, and, in response, electrical controller 126 may determine acceleration and deceleration profiles for the tilt motor and pan motor in order to achieve the selected field of view of camera 106. The movements of the pan and tilt motors 64, 100 which control the pan and tilt positions of camera 106 are indicated in FIG. 7 by dashed arrow 136.

In one embodiment, a plane of tilting 138 (FIG. 1) of tilting and panning stage 46 is parallel to and offset from panning axis 22 by a distance 140 of approximately between three and twelve inches. In a particular embodiment, distance 140 is approximately between six and nine inches.

In operation, large domain sensor 24 may capture a wide-angle image of the field of view below sensor 24. In one embodiment, the field of view of sensor 24 spans a hemispherical arc of about 180 degrees, which may be defined as the space below plane 26 (FIG. 2). The images captured by sensor 24 may be analyzed by an image processing algorithm within controller 126 and/or analyzed by a human operator who may view the captured images on a video monitor. In the case of a building or premises security application, the algorithm and/or human operator may determine whether an intruder or other moving object is present within the captured images.

Camera 106 may also capture images, but with a smaller field of view, and with greater resolution and/or less distortion than sensor 24. Controller 126 may be programmed to control the panning and tilting of camera 106 such that camera 106 repeatedly tours or scans the entire premises that are to be secured. In one embodiment, camera 106 undergoes panning and tilting until an image of every viewpoint within the secured premises has been captured, and then this tour of panning and tilting movements is repeated indefinitely.

Instead of the above-described pre-programmed panning and tilting tour of camera 106, the panning and tilting movements of camera 106 may be controlled in order to focus camera 106 on any moving object detected by sensor 24, or to focus on a field of view of particular interest. For example, controller 126 may include an automatic tracking algorithm that detects the presence of a moving object in the images captured by sensor 24 and/or camera 106, and then controls the panning and tilting movements of camera 106 in order to maintain the moving object within the field of view of camera 106.

Alternatively, or in addition, the human operator may control the panning and tilting movements of camera 106, such as with a joystick (not shown). For example, the operator may see an intruder or other object of interest on the monitor he is watching, and may thereafter pan and/or tilt camera 106 such that the object of interest remains within the field of view of the camera. In one embodiment, the operator's panning and tilting inputs override the repetitive automatic touring of camera 106. In another embodiment, the operator's panning and tilting inputs override the algorithm of controller 126 for automatically tracking moving objects. In yet another embodiment, camera 106 may undergo panning and tilting movements only under the manual control of the operator.

In association with one particular embodiment, assume that surveillance camera arrangement 10 begins operation in the position depicted in FIGS. 5 and 6a. After capturing an image in this position, camera 106 tilts to each of the positions of FIGS. 6b-e in sequence, capturing an image in each position. Camera 106 may then pan approximately thirty degrees in either of the clockwise and counterclockwise directions. At this new pan position, camera 106 may then capture an image at each of the five tilt positions of FIGS. 6a-e. Camera 106 may proceed to each of the remaining ten of the twelve pan positions that are equally spaced thirty degrees apart. Camera 106 may then capture an image at each of the five tilt positions of FIGS. 6a-e while camera 106 is at each of the pan positions.

In one embodiment, the field of view of camera 106 is sized such that every viewpoint within the monitored space may have its image captured by camera 106 at least one combination of the above-described pan positions and tilt positions. If the field of view of camera 106 is larger, then images of all of the viewpoints may be captured at fewer and more spaced apart positions of camera 106. Conversely, if the field of view of camera 106 is smaller, then images of all of the viewpoints may be captured at a greater number positions of camera 106 that are more spaced apart.

As described above, by panning and tilting within a tilt plane parallel to and offset from the pan axis, camera 106 may capture an unobstructed image of every viewpoint within a monitored area of space despite large domain sensor 24 being disposed at a vertical level lower than that of camera 106. It will be appreciated by those of skill in the art, however, that the tilt plane of the camera need not be strictly parallel to the pan axis, but rather may be skewed with respect to the pan axis within a tolerance level that may be dependent upon the size of the field of view of the camera.

Figure 8:
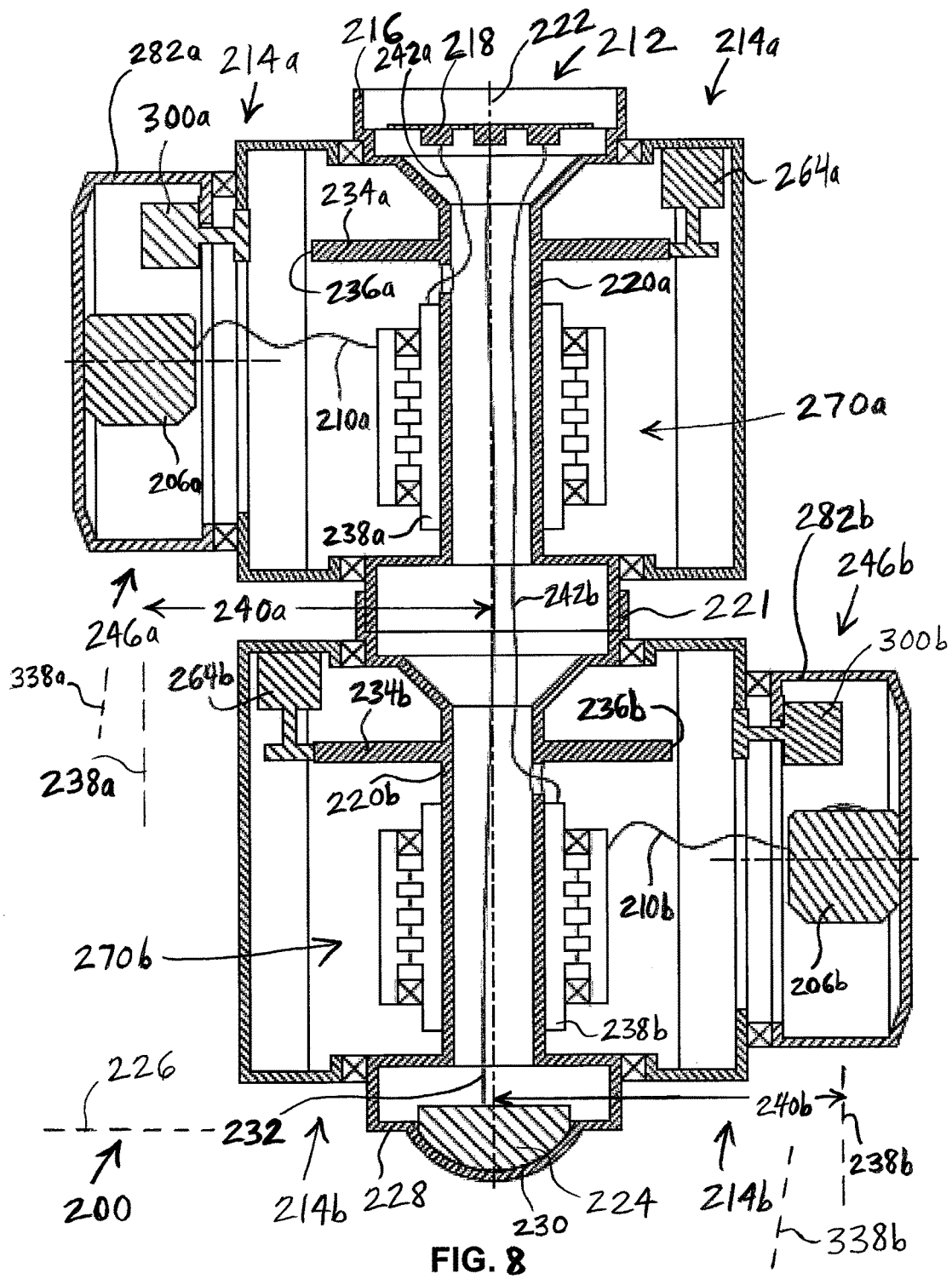
FIG. 8 is a cross sectional side view of another embodiment of a surveillance camera arrangement of the present invention.

In FIG. 8 there is illustrated another embodiment of a surveillance camera arrangement 200 of the present invention including an elongated stationary stage 212 and two moving stages 214a, 214b that are vertically offset from one another. Stationary stage 212 includes a stationary base 216 having an electrical interface 218 disposed therein. Stationary stage 212 also includes a top cylindrical core 220a, a bottom cylindrical core 220b, and a disc-shaped hollow coupling 221 that fixedly attaches cores 220a-b together. Each of cores 220a-b and coupling 221 may be centered relative to a pan axis 222. That is, pan axis 222 is coincident with a longitudinal axis of cores 220a-b and coupling 221.

Stationary stage 212 further includes a stationary large-domain sensor 224 disposed within a stationary sensor enclosure 228 at the bottom of lower core 220b. Enclosure 228 includes a window 230 through which sensor 224 may sense objects and movements.

An electrical connection in the form of an electrical conductor 232 electrically interconnects sensor 224 and electrical interface 218 in base 216. The electrical connection may include a plurality of electrical conductors.

Attached to each of cylindrical cores 220a-b is a respective annular pan gear 234a-b that is oriented perpendicular to vertical pan axis 222. A plurality of gear teeth (not shown) may be disposed on the outer circumferential surface 336a-b of gears 234a-b.

An electrical connection in the form of an electrical conductor 242a electrically interconnects electrical interface 218 and top slip ring stator 238a. The electrical connection may include a plurality of electrical conductors. Similarly, another electrical connection in the form of an electrical conductor 242b electrically interconnects electrical interface 218 and bottom slip ring stator 238b.

The entireties of moving stages 214a-b may be independently rotatable about the vertical pan axis 222. Each of moving stages 214a-b may include a respective tilting and panning stage 246a-b that is tiltable independently of the other tilting and panning stage. Although tilting and panning stages 246a-b are shown in FIG. 8 as being 180 degrees rotationally offset from one another, this is only for clarity of illustration, and any rotational offset between tilting and panning stages 246a-b may be possible at any point in time.

That is, the rotational offset between tilting and panning stages 246*a-b* may change with time during operation of arrangement 200.

In another embodiment, however, tilting and panning stages 246*a-b* have a fixed rotational offset between them, such as 180 degrees as shown in FIG. 8. This may have the advantage of ensuring that bottom tilting and panning stage 246*b* does not obstruct the field of view of top tilting and panning stage 246*a*.

Because tilting and panning stages 246*a-b* are offset from panning axis 222, it is possible to provide more than one of these tilting and panning stages, and hence more than one camera to monitor the space. That is, in the embodiment of FIG. 8, two tilting and panning stages and two cameras are provided. This has the advantage of capturing images of more than one field of view, and thus providing more information to the algorithm or human operator. Depending upon the size of the enclosures or housings for the tilting and panning stages, three or perhaps more tilting and panning stages may be provided in a surveillance arrangement of the present invention without any of the cameras having an obstructed view.

Figure 9:
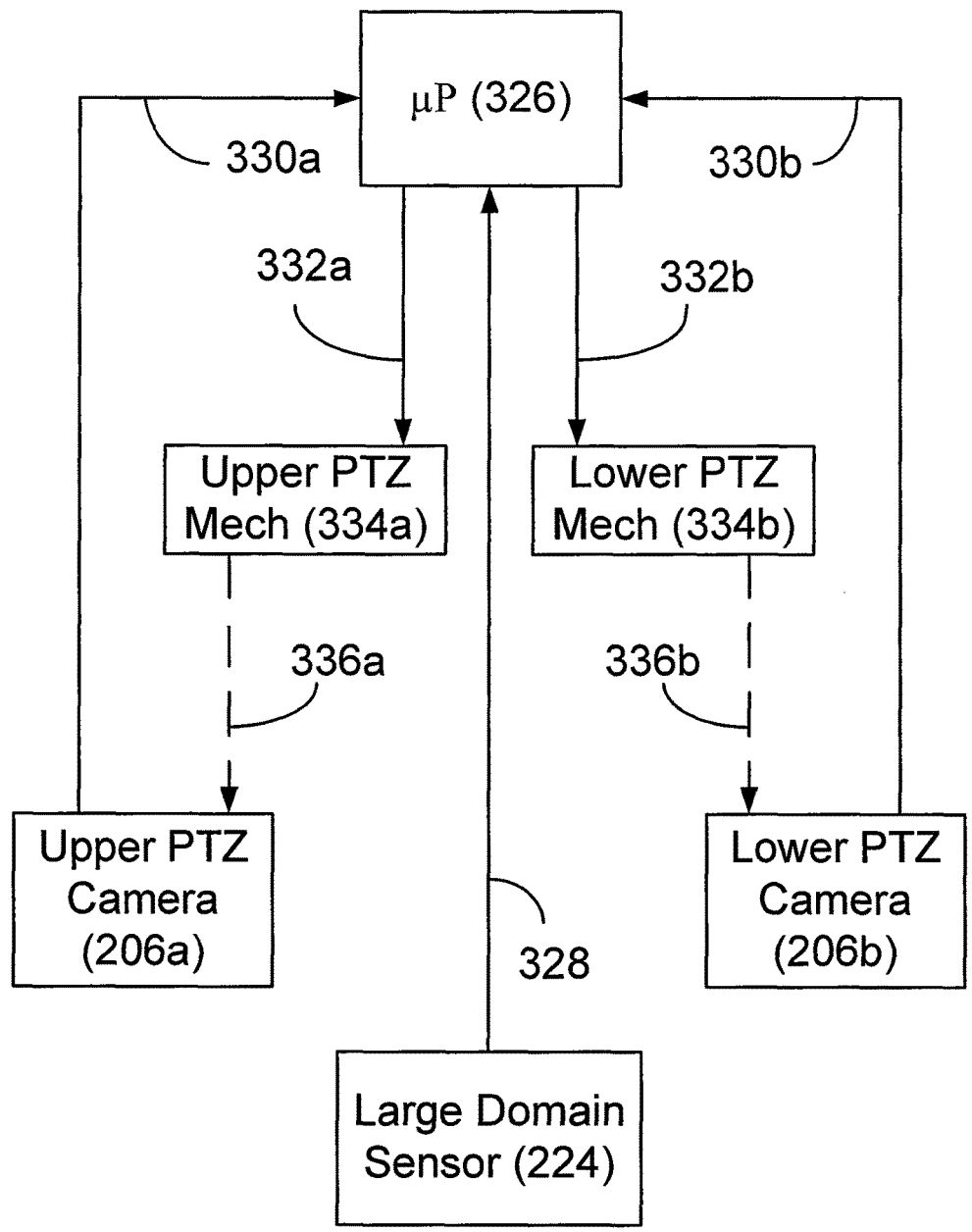
FIG. 9 is a block diagram of the surveillance camera arrangement of FIG. 8.

A block diagram of surveillance camera arrangement 200 is illustrated in FIG. 9. Large domain sensor 224 may be electrically connected to an electrical controller 326 and may provide sensor signals to electrical controller 326 as indicated by arrow 328. Electrical controller 326 may include a microprocessor. The sensor signals may be carried from sensor 224 to electrical controller 326 via conductor 232 and electrical interface 218. Another electrical conductor (not shown) may carry the sensor signals from interface 218 to electrical controller 326.

Similarly, upper camera 206*a* may be electrically connected to electrical controller 326 and may provide camera signals to electrical controller 326 as indicated by arrow 330*a*. The camera signals may be carried from camera 206*a* to electrical controller 326 via conductor 210*a* (FIG. 8), slip ring 270*a*, conductor 242*a* and electrical interface 218. Another electrical conductor (not shown) may carry the camera signals from interface 218 to electrical controller 326.

As indicated at arrow 332*a*, electrical controller 326 may transmit control information and commands to a pan tilt zoom (PTZ) mechanism 334*a*. In one embodiment, PTZ mechanism 334*a* includes pan motor 264*a* and tilt motor 300*a*. The source of at least a portion of the control information and commands may be a human operator who may use a user interface (not shown) to input control information and commands. The control information and commands may then be transmitted via an electrical conductor (not shown) to electrical controller 326 for processing. The control information and commands may instruct the pan and tilt motors 264*a*, 300*a* in which direction (e.g., clockwise or counterclockwise) to perform the panning and/or tilting movements. The control information and commands may further control the speed (which may be zero for a majority of the operating time of surveillance camera arrangement 200), acceleration, and/or deceleration of the panning and tilting movements. For example, a human operator may select a new field of view of the camera, and, in response, electrical controller 326 may determine acceleration and deceleration profiles for the tilt motor and pan motor in order to achieve the selected field of view of camera 206*a*. The movements of the pan and tilt motors 264*a*, 300*a* which control the pan and tilt positions of camera 206*a* are indicated in FIG. 9 by dashed arrow 336*a*.

In one embodiment, a plane of tilting 238*a* (FIG. 8) of upper tilting and panning stage 246*a* is parallel to and offset from panning axis 222 by a distance 240*a* of approximately between three and twelve inches. In a particular embodiment, distance 240*a* is approximately between six and nine inches.

Similarly, lower camera 206*b* may also be electrically connected to electrical controller 326 and may provide camera signals to electrical controller 326 as indicated by arrow 330*b*. The camera signals may be carried from camera 206*b* to electrical controller 326 via conductor 210*b* (FIG. 8), slip ring 270*b*, conductor 242*b* and electrical interface 218. Another electrical conductor (not shown) may carry the camera signals from interface 218 to electrical controller 326.

As indicated at arrow 332*b*, electrical controller 326 may transmit control information and commands to a pan tilt zoom (PTZ) mechanism 334*b*. In one embodiment, PTZ mechanism 334*b* includes pan motor 264*b* and tilt motor 300*b*. The source of at least a portion of the control information and commands may be a human operator who may use a user interface (not shown) to input control information and commands. The control information and commands may then be transmitted via an electrical conductor (not shown) to electrical controller 326 for processing. The control information and commands may instruct the pan and tilt motors 264*b*, 300*b* in which direction (e.g., clockwise or counterclockwise) to perform the panning and/or tilting movements. The control information and commands may further control the speed (which may be zero for a majority of the operating time of surveillance camera arrangement 200), acceleration, and/or deceleration of the panning and tilting movements. For example, a human operator may select a new field of view of the camera, and, in response, electrical controller 326 may determine acceleration and deceleration profiles for the tilt motor and pan motor in order to achieve the selected field of view of camera 206*b*. The movements of the pan and tilt motors 264*b*, 300*b* which control the pan and tilt positions of camera 206*b* are indicated in FIG. 9 by dashed arrow 336*b*.

In one embodiment, a plane of tilting 238*b* (FIG. 8) of lower tilting and panning stage 246*b* is parallel to and offset from panning axis 222 by a distance 240*b* of approximately between three and twelve inches. In a particular embodiment, distance 240*b* is approximately between six and nine inches.

However, in other embodiments, one or both of tilting planes 238*a-b* may not be parallel to the pan axis and/or to each other. In one particular embodiment, upper tilting plane 238*a* may be angled so that upper camera 206*a* is directed slightly outward, as indicated by alternative tilting plane 338*a*. An angle between alternative tilting plane 338*a* and the vertically downward direction may be approximately between two and thirty degrees. In a specific embodiment, the angle between alternative tilting plane 338*a* and the vertically downward direction may be approximately between five and fifteen degrees. Similarly, lower tilting plane 238*b* may be angled so that lower camera 206*b* is directed slightly inward, as indicated by alternative tilting plane 338*b*. An angle between alternative tilting plane 338*b* and the vertically downward direction may be approximately between two and fifteen degrees. In a specific embodiment, the angle between alternative tilting plane 338*b* and the vertically downward direction may be approximately between five and ten degrees.

In the embodiment of FIG. 8, the offset distances 240*a-b* of the tilting planes from the pan axis are approximately equal. However, in another embodiment, the upper offset distance 240*a* is greater than the lower offset distance 240*b*. This may have the advantage of preventing enclosure 282*b* of lower tilting and panning stage 246*b* from blocking the field of view of upper camera 206*a* when the upper and lower cameras 206*a-b* are rotationally aligned, or close to being rotationally aligned. Thus, in this embodiment, both cameras 206*a-b* may have the same panning position, or close to the same panning position, without the field of view of upper camera 206*a* being blocked. A respective lower end wall of each of enclosures 282*a-b* may have a throughhole or transparent window (not shown) through which the camera may capture images.

In operation, large domain sensor 224 may capture a wide-angle image of the field of view below sensor 224. In one embodiment, the field of view of sensor 224 spans a hemispherical arc of about 180 degrees, which may be defined as the space below plane 226 (FIG. 8). The images captured by sensor 224 may be analyzed by an image processing algorithm within controller 226 and/or analyzed by a human operator who may view the captured images on a video monitor. In the case of a building or premises security application, the algorithm and/or human operator may determine whether an intruder or other moving object is present within the captured images.

Cameras 206*a-b* may also capture images, but with a smaller field of view, and with greater resolution and/or less distortion than sensor 224. In one embodiment, camera 206*b* has a smaller field of view, and greater resolution than does camera 206*a*. Controller 226 may be programmed to control the panning and tilting of cameras 206*a-b* such that each of cameras 206*a-b* repeatedly tour or scan the entire premises that are to be secured. In one embodiment, each of cameras 206*a-b* undergoes panning and tilting until an image of every viewpoint within the secured premises has been captured, and then this tour of panning and tilting movements is repeated indefinitely.

Instead of the above-described pre-programmed panning and tilting tour of cameras 206*a-b*, the panning and tilting movements of cameras 206*a-b* may be controlled in order to focus cameras 206*a-b* on any moving object detected by sensor 224, or to focus on a field of view of particular interest. For example, controller 326 may include an automatic tracking algorithm that detects the presence of a moving object in the images captured by sensor 224 and/or cameras 206*a-b*, and then controls the panning and tilting movements of cameras 206*a-b* in order to maintain the moving object within the field of view of cameras 206*a-b*.

Alternatively, or in addition, the human operator may control the panning and tilting movements of each of cameras 206*a-b* independently, such as with a joystick (not shown). For example, the operator may see an intruder or other object of interest on the monitor he is watching, and may thereafter pan and/or tilt one or both of cameras 206*a-b* such that the object of interest remains within the field of view of the camera. The operator may control the panning and tilting of whichever one of cameras 206*a-b* is most suitable for viewing the moving object in terms of field of view and resolution, for example. In one embodiment, the operator's panning and tilting inputs override the repetitive automatic touring of one or both of cameras 206*a-b*. In another embodiment, the operator's panning and tilting inputs override the algorithm of controller 226 for automatically tracking moving objects. In yet another embodiment, one or both of cameras 206*a-b* may undergo panning and tilting movements only under the manual control of the operator.

In one particular embodiment, each of cameras 206*a-b* may tilt to each of the positions of FIGS. 6*b-e*, and any position therebetween. Each of cameras 206*a-b* may also pan to any of the panning positions within the 360 degree rotation in both the clockwise and counterclockwise directions.

As shown in all of the above illustrated embodiments, the camera or cameras are rotatably and/or tiltably coupled to the large domain sensor. This coupling may include the camera(s) and large domain sensor being attached to the same frame, mechanism or apparatus.

Other features of arrangement 200 may be substantially similar to those of arrangement 10, and thus are not described in detail herein in order to avoid needless repetition.

Figure 10A:
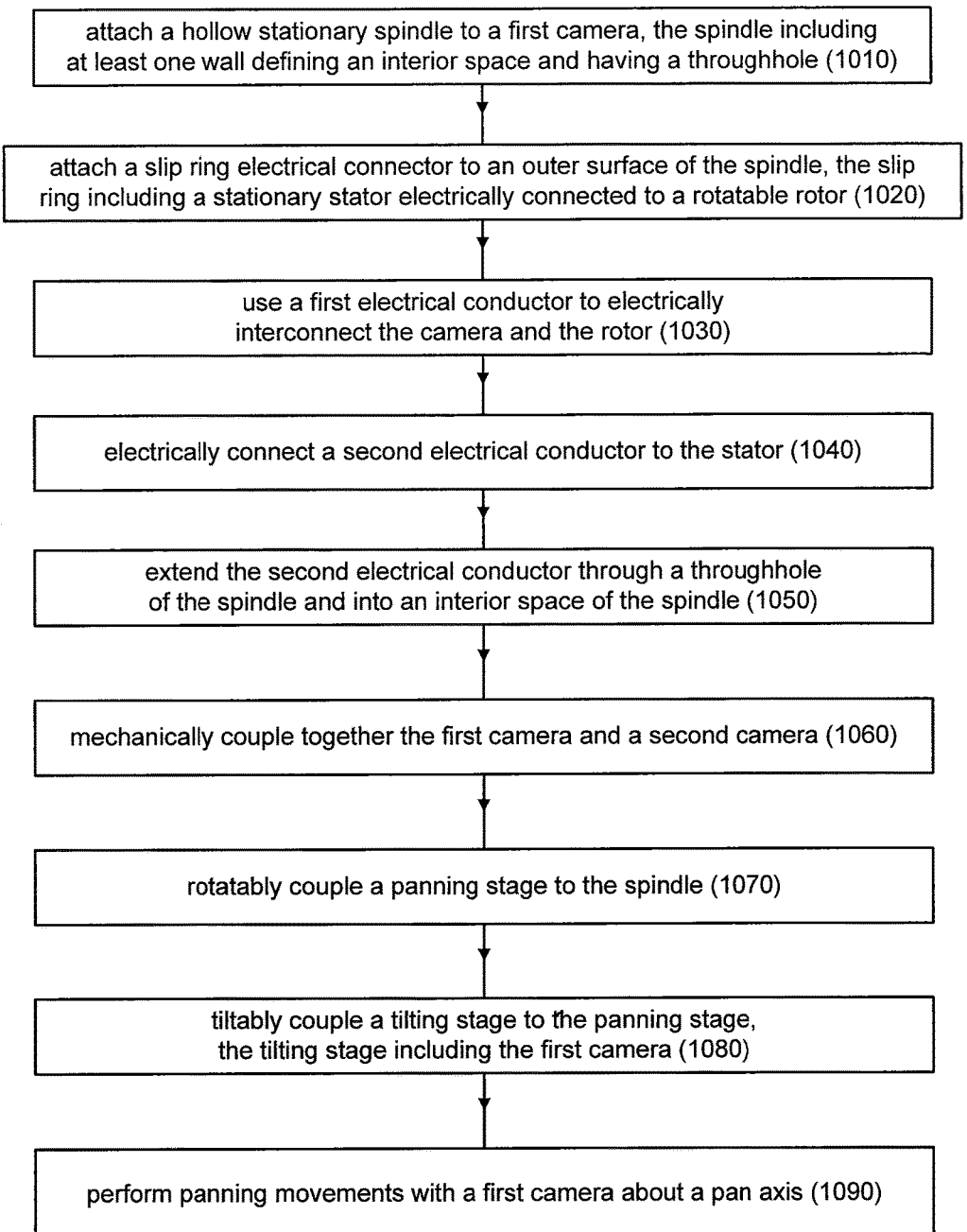

FIGS. 10*a-b* illustrate one embodiment of a method 1000 of the present invention for operating a surveillance camera arrangement. In a first step 1010, a hollow stationary spindle is attached to a first camera, the spindle including at least one wall defining an interior space and having a throughhole. For example, a stationary, hollow, cylindrical core 20 that may be in the form of a spindle may be attached to camera 106 via rotatable couplings including enclosures 50, 82.

In a next step 1020, a slip ring electrical connector may be attached to an outer surface of the spindle, the slip ring including a stationary stator electrically connected to a rotatable rotor. For example, slip ring electrical connector 70 may be attached to an outer surface of spindle 20. Slip ring 70 may include a stationary stator 38 electrically connected to a rotatable rotor 68.

Next, in step 1030, a first electrical conductor is used to electrically interconnect the camera and the rotor. For example, electrical conductor 110 may electrically interconnect camera 106 and rotor 68.

In step 1040, a second electrical conductor is electrically connected to the stator. That is, electrical conductor 42 may be electrically connected to stator 38.

In a next step 1050, the second electrical conductor is extended through a throughhole of the spindle and into an interior space of the spindle. For example, electrical conductor 42 may be threaded through throughhole 44 in spindle 20 and into a hollow space within spindle 20.

Next, in step 1060, the first camera and a second camera may be mechanically coupled together. That is, camera 106 may be mechanically coupled via enclosures 50, 82 to a wide angle camera 24 that is fixedly attached to spindle 20.

In step 1070, a panning stage may be rotatably coupled to the spindle. For example, a panning-only stage 48 may be rotatably coupled to spindle 20 by ring-shaped pan bearings/seals 74, 76.

In a next step 1080, a tilting stage is tiltably coupled to the panning stage, the tilting stage including the first camera. For example, tilting and panning stage 46 may be tiltably coupled to panning stage 48 via ring-shaped bearing/seal 112. Tilting and panning stage 46 may include camera 106.

Next, in step 1090, panning movements are performed with a first camera about a pan axis. For example, in the embodiment of FIG. 1, pan motor 64 may operate to thereby rotate moving stage 14 about the vertical pan axis 22. Moving stage 14 includes camera 106, and thus camera 106 thereby performs panning movements about pan axis 22.

In a next step 1100, tilting movements are performed with the first camera within a plane of tilting motion, the plane of tilting motion being offset from, and substantially parallel to, the pan axis. That is, tilt motor 100 may operate to thereby rotate tilting and panning stage 46 about the horizontal tilt axis 108. Tilting and panning stage 46 includes camera 106, and thus camera 106 thereby performs tilting movements about tilt axis 108.

In step 1110, the second camera is maintained in a stationary condition throughout the panning and tilting movements. For example, wide angle camera 24 may be fixed to stationary spindle 20, and thus may remain stationary (e.g., neither rotate nor tilt) throughout the above-described panning and tilting movements of camera 106.

Next, in step 1120, images are captured with the first camera. That is, before, during and/or after the panning and/or tilting, camera 106 may capture images through a throughhole or transparent window in end wall 94 of enclosure 82.

In a next step 1130, images are captured with a second camera, the second camera being substantially aligned with the pan axis, the second camera having a wider field of view than the first camera. For example, images may be captured with stationary large-domain sensor 24, which may be in the form of a fisheye camera. Sensor 24 is aligned with pan axis 22 and has a larger field of view than does camera 106. In one embodiment, sensor 24 has a hemispherical field of view defined below plane 26 (FIG. 2).

In step 1140, a moving object is identified in the images captured by the second camera. For example, the images captured by camera 24 may be processed by an image processing algorithm to identify a moving object, such as a human intruder, in the images. The presence of a moving object may be identified based on differences in a sequence of images captured over a short period of time (e.g. a few seconds). Alternatively, the images captured by camera 24 may be displayed on a monitor, and human personnel may visually identify a moving object within the displayed images.

In a final step 1150, the first camera is used to track movements of the moving object. That is, once the location of the moving object has been determined by the image processing algorithm or by human personnel, then camera 106 may be panned, tilted and/or zoomed such that the moving object is within the field of view of camera 106. Thereafter, images captured by camera 106 may be analyzed by the image processing algorithm in order to determine the direction and magnitude of any further movements of the moving object. Camera 106 may then be panned, tilted and/or zoomed in order to maintain the moving object within the field of view of camera 106.

While this invention has been described as having an exemplary design, the present invention may be further modified within the spirit and scope of this disclosure. This application is therefore intended to cover any variations, uses, or adaptations of the invention using its general principles.

What is claimed is:

1. A surveillance camera arrangement comprising:
   A PTZ camera configured to:
      perform panning movements about a pan axis; and
      perform tilting movements within a plane of tilting motion, such that a range of possible tilt positions is captured by the plane of tilting motion, the plane of tilting motion being offset from, and substantially parallel to and non-coincident with, the pan axis, and
   a large domain sensor substantially aligned with the pan axis, the large domain sensor having a wider field of view than the PTZ camera,
   wherein the PTZ camera is mechanically coupled to the large domain sensor.

2. The arrangement of claim 1 wherein the large domain sensor is configured to remain stationary during the panning and tilting movements of the PTZ camera, and wherein the PTZ camera is configured to rotate to panning positions within a 360 degree rotation in both the clockwise and counterclockwise directions.

3. The arrangement of claim 1 wherein the plane of tilting motion is offset from the pan axis by a distance of approximately between three and twelve inches.

4. The arrangement of claim 1 wherein the large domain sensor comprises a second camera.

5. The arrangement of claim 1 further comprising:
   a hollow stationary spindle attached to the large domain sensor, the spindle including at least one wall defining an interior space and having a through hole;
   a slip ring electrical connector attached to an outer surface of the spindle, the slip ring electrical connector including a stationary stator electrically connected to a rotatable rotor;
   a first electrical conductor electrically interconnecting the camera and the rotor; and
   a second electrical conductor electrically connected to the stator and extending through the throughhole of the spindle and into the interior space of the spindle.

6. The arrangement of claim 5 further comprising:
   a panning stage rotatably coupled to the spindle; and
   a tilting stage attached to the panning stage and tiltable relative to the panning stage along the plane of tilting, the tilting stage including the camera.

7. The arrangement of claim 1, wherein a tilting axis for the PTZ camera substantially intersects the pan axis of the surveillance camera arrangement.

8. The arrangement of claim 1, wherein the PTZ camera is disposed so that a center of the field of view of the PTZ camera is free from being perpendicular to a tilting axis of the PTZ camera.

9. The arrangement of claim 8, wherein the field of view of the PTZ camera is fixed at an angle between approximately two and thirty degrees relative to an axis perpendicular from the tilting axis of the PTZ camera, and the field of view of the PTZ camera is oriented outwardly away from the pan axis.

10. The arrangement of claim 1, wherein the offset is a distance from the PTZ camera to the pan axis, and the plane of tilting motion defined by the PTZ camera is closest to the pan axis at the PTZ camera, whereby the offset is a minimum distance of the PTZ camera from the pan axis.

11. A method of operating a surveillance camera arrangement comprising the steps of:
   performing panning movements with a first camera about a pan axis;
   performing tilting movements with the first camera within a plane of tilting motion, such that a range of possible tilt positions is captured by the plane of tilting motion, the plane of tilting motion being offset from, and substantially parallel to and non-coincident with, the pan axis;
   capturing images with the first camera; and
   capturing images with a second camera, said second camera being substantially aligned with the pan axis, the second camera having a wider field of view than the first camera,
   wherein the first camera and the second camera are mechanically coupled.

12. The method of claim 11 comprising the further step of maintaining the second camera in a stationary condition throughout the panning and tilting movements, and wherein the wide-angle image of the field of view of the second camera is centered along the pan axis.

13. The method of claim 11 comprising the further steps of:
attaching a hollow stationary spindle to the first camera, the spindle including at least one wall defining an interior space and having a throughhole;
attaching a slip ring electrical connector to an outer surface of the spindle, the slip ring including a stationary stator electrically connected to a rotatable rotor;
using a first electrical conductor to electrically interconnect the first camera and the rotor;
electrically connecting a second electrical conductor to the stator; and
extending the second electrical conductor through the throughhole of the spindle and into the interior space of the spindle.

14. The method of claim 13 comprising the further steps of:
rotatably coupling a panning stage to the spindle; and
tiltably coupling a tilting stage to the panning stage, the tilting stage including the first camera.

15. The method of claim 11 comprising the further steps of:
identifying a moving object in the images captured by the second camera;
using the first camera to track movements of the moving object, and
panning the PTZ camera to panning positions within a 360 degree rotation in both the clockwise and counter-clockwise directions.

16. The method of claim 11, wherein the first camera is disposed so that a center of the field of view of the first camera is free from being perpendicular to a tilting axis of the first camera.

17. The method of claim 16, wherein the field of view of the first camera is fixed at an angle between approximately two and thirty degrees relative to an axis perpendicular from the tilting axis of the first camera, and the field of view of the first camera is oriented outwardly away from the pan axis.

18. A surveillance camera arrangement comprising:
a first camera configured to:
perform first panning movements about a pan axis;
perform first tilting movements within a first plane of tilting motion, such that a range of possible tilt positions is captured by the first plane of tilting motion, the first plane of tilting motion being offset from, and substantially parallel to and non-coincident with, the pan axis;
a second camera mechanically coupled to the first camera, the second camera being configured to:
perform second panning movements about the pan axis;
perform second tilting movements within a second plane of tilting motion, such that a range of possible tilt positions is captured by the second plane of tilting motion, the second plane of tilting motion being offset from, and substantially parallel to and non-coincident with, the pan axis, a tilting axis of the second camera substantially intersecting with the pan axis; and
a third camera mechanically coupled to each of the first and second cameras, the third camera being substantially aligned with the pan axis, the third camera having a wider field of view than each of the first and second cameras.

19. The arrangement of claim 18 wherein the first camera and the second camera are offset 180 degrees relative to each other in a direction of panning rotation.

20. The arrangement of claim 18 wherein the third camera is configured to remain stationary during the panning and tilting movements of the first and second cameras, and wherein the wide-angle image of the field of view of the third camera is centered along the pan axis.

21. The arrangement of claim 18 wherein each of the first and second planes of tilting motion is offset from the pan axis by a distance of approximately between three and twelve inches.

22. The arrangement of claim 18 wherein the first plane of tilting motion is offset from the pan axis by a greater distance than is the second plane of tilting motion.

23. The arrangement of claim 18 further comprising:
a hollow stationary spindle attached to the third camera, the spindle including at least one wall defining an interior space and having two throughholes, each of the throughholes receiving a respective electrical conductor therethrough; and
first and second slip ring electrical connectors attached to an outer surface of the spindle, each of the slip ring electrical connectors including a respective stationary stator electrically connected to a respective rotatable rotor.

24. The arrangement of claim 23 further comprising:
first and second panning stages rotatably coupled to the spindle; and
first and second tilting stages attached to the first and second panning stage, respectively, each said tilting stage being tiltable relative to the respective panning stage along the respective plane of tilting, the first tilting stage including the first camera, the second tilting stage including the second camera.

\* \* \* \* \*